United States Patent [19]
Dohnke

[11] Patent Number: 6,069,951
[45] Date of Patent: May 30, 2000

[54] DISTRIBUTION BLOCK FOR TELECOMMUNICATIONS AND DATA APPLICATIONS

[75] Inventor: Ingo Dohnke, Teltow, Germany

[73] Assignee: Krone GmbH, Germany

[21] Appl. No.: 09/037,266

[22] Filed: Mar. 9, 1998

[30] Foreign Application Priority Data

Mar. 10, 1997 [DE] Germany .............................. 197 11 128

[51] Int. Cl.[7] .............................. H04M 1/00; H01R 4/24
[52] U.S. Cl. ............................................. 379/438; 439/404
[58] Field of Search .............................. 379/438; 439/391, 439/395, 396, 404, 717

[56] References Cited

U.S. PATENT DOCUMENTS

| | | |
|---|---|---|
| 4,196,959 | 4/1980 | Chesemore et al. . |
| 4,997,387 | 3/1991 | Knoll . |
| 5,073,120 | 12/1991 | Lincoln et al. . |

FOREIGN PATENT DOCUMENTS

| | | |
|---|---|---|
| 4 262 | 2/1981 | Austria . |
| 0 071 0264 | 2/1983 | European Pat. Off. . |
| 0 340 116 | 11/1989 | European Pat. Off. . |
| 0 365 780 A2 | 5/1990 | European Pat. Off. . |
| 195 32 184 C1 | of 0000 | Germany . |
| 39 17 270 C2 | of 0000 | Germany . |
| 82 02 195 U | 6/1982 | Germany . |
| 35 09 523 C3 | 9/1986 | Germany . |
| 41 06 412 C2 | 10/1991 | Germany . |
| 94 02 468 U | 4/1995 | Germany . |
| 195 32 184 C1 | 10/1996 | Germany . |
| 296 18 438 | 1/1997 | Germany . |
| 195 37 529 C1 | 3/1997 | Germany . |
| 298 02 674 | 5/1998 | Germany . |

*Primary Examiner*—Jack Chiang
*Attorney, Agent, or Firm*—McGlew and Tuttle P.C.

[57] ABSTRACT

The invention relates to a distribution block for telecommunications and data technology, in particular for the main distribution frame of telephone and data lines, having contact springs 1. The springs are arranged in the interior of the modular distribution block and are formed from connection contacts 7, 8, using insulation-piercing terminal technology (insulation-displacement contacts) in the front and rear side of the block and from a telecommunications contact 22 in the central region. A pick-off contact 19 is formed in the front region of the contact spring 1. A distribution block of the generic type is provided which contains an uncomplicated contact element and on which the wire routing is improved and in which reliable fitting of the cable wires is ensured. The contact spring 1 is formed from a base part 3 and a contact spring part 2 fitted to it, fixing points 4 for the longitudinal direction and an opening 6 for the fitted contact spring part 2 to pass through being provided in the central region of the base part 3. A hole 5 is arranged in the front region of the base part 3 in order to fix the position of the contact spring part 2 to be fitted.

16 Claims, 7 Drawing Sheets

DISTRIBUTION BLOCK FOR TELECOMMUNICATIONS AND DATA APPLICATIONS

FIELD OF THE INVENTION

The invention relates to a distribution block for telecommunications and data technology, in particular for the main distribution frame of telephone and data lines having contact springs which are arranged in the interior of the modular distribution block and are formed from connection contacts, using insulation-piercing terminal technology, on the front and rear side of the block and from a telecommunications contact in the central region, and in which a pick-off contact is formed in, the front region of the contact spring.

BACKGROUND OF THE INVENTION

Such distribution devices, in particular for the main distribution frame of telephone systems, are used as an interface for telephone subscriber points and exchanges.

DE 195 37 529.7 discloses a distribution block for telecommunications and data technology, in particular for the main distribution frame of telephone and data lines, which has insulation-piercing terminal contact elements for connection of both the subscriber and exchange cables, and which is of modular construction and contains integrally constructed contact springs in the interior. The integral contact springs arranged in the interior of the distribution block are formed from connecting contacts using insulation-piercing terminal technology on the front and r tar side of the block, and from a telecommunications contact in the central region. The telecommunications contact comprises two contact surfaces, which can be constructed as double contacts. A pick-off contact is constructed in the front region of the contact spring. The manufacture of these integral contact springs is complicated.

SUMMARY AND OBJECTS OF THE INVENTION

It is a primary object of the invention to develop a distribution block which contains an uncomplicated contact element, and on which the wire routing is improved and in which reliable fitting of the cable wires is ensured.

According to the invention, a distribution block for telecommunications and data technology applications is provided, in particular a distribution block for the main distribution frame of telephone and data lines. The block includes contact springs which are arranged in the interior of the modular distribution block and are formed from connection contacts (insulation displacement contacts) disposed on the front and rear side of the block and form a telecommunications contact in a central region. A pick-off contact is formed in the front region of the contact spring. The contact spring is formed from a base part and a contact spring part fitted to it. Fixing points, for fixing in the longitudinal direction, and an opening, for the fitted contact spring part to pass through, are provided in a central region of a base part. A hole is arranged in the front region of the base part in order to fix the position of the contact spring part to be fitted.

The two-part contact spring, which is designed according to the invention from a base part and a contact spring part, ensures uncomplicated, space-saving manufacture of the content elements of the distribution block, which manufacturing process can be automated. The two part design of the contact spring allows different materials to be brought together which ensure optimization of the characteristics of the contacts in terms of spring travels, contact forces and protection functions to be provided. The moldings which are integrally formed on one side of the housing parts in the region of the insulation-piercing terminal contacts ensure that the fitting tool can be applied to the insulation-piercing terminal contacts in only one direction. This ensures that the wire to be connected is always cut off on the correct side.

The wire routing channels provided on one surface of the modules make it easier to assign and route patching wires to the contacts.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Referring to the drawings in particular, a main distribution frame for telecommunications and data networks is provided. The distribution block comprising modules 17 according to FIGS. 7 to 10 are arranged one above the other in vertical blocks in mounting brackets, that are not illustrated. Each distribution block forms a functional module, for example in the switching contact position or in the isolating contact position. The distribution blocks comprise identical modules 17 and differ only in their mutual position and/or in the arrangement of contact springs 1 according to FIGS. 1 to 6 as well as in the circuitry with or without an overvoltage protective plug or the like.

Figure 9:
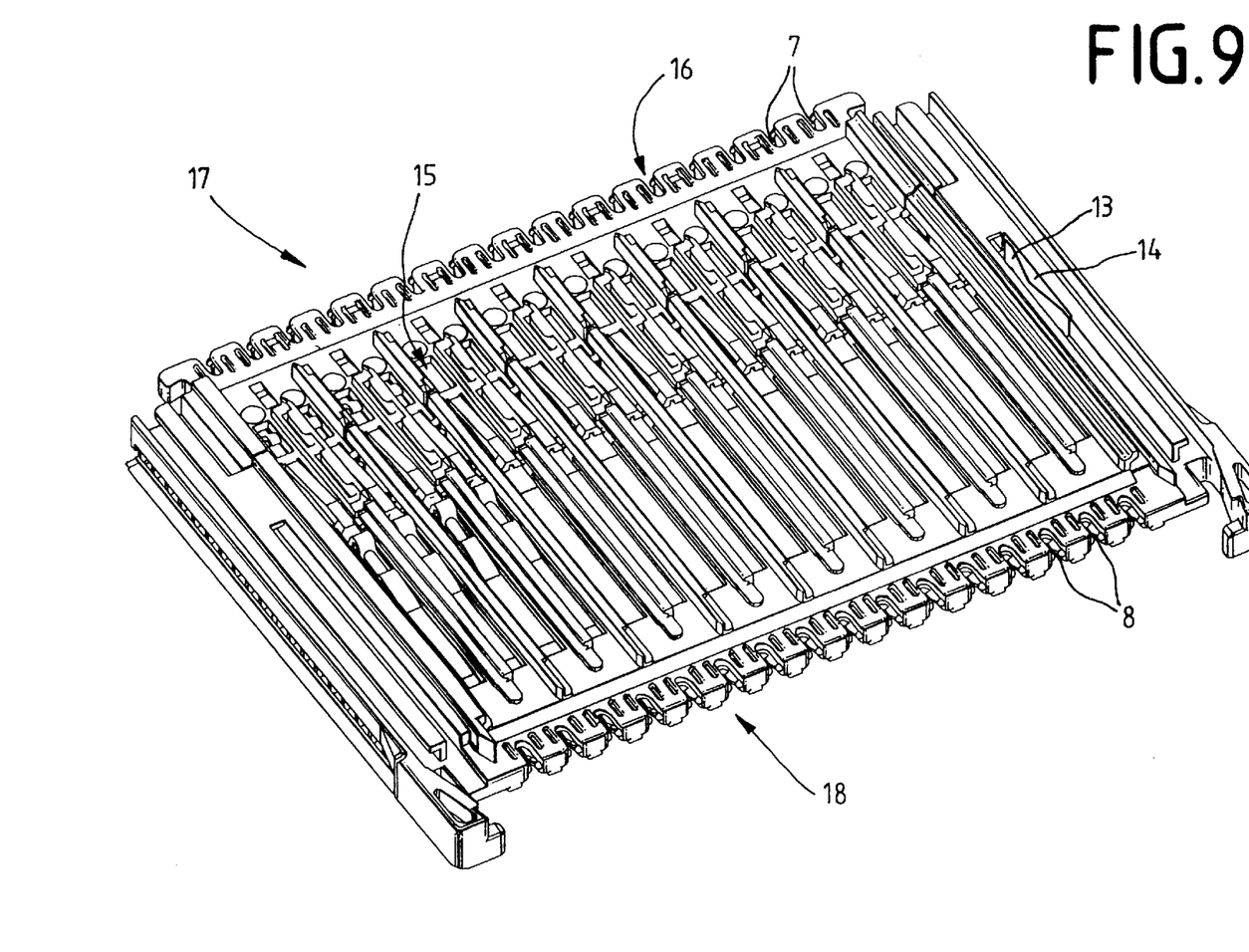
FIG. 9 is a perspective plan view of the underneath of the module according to FIG. 7.

Each distribution block comprises two physically identical modules 17 with chambers 15 and slots 16 which, pushed one above the other, form the distribution block, one contact spring 1 being fitted in each of the chambers; 15 (FIG. 9).

The front and rear insulation-piercing terminal contacts 7, 8 of the contact springs 1 (FIGS. 1 to 6) are accessible in the slots 16.

Figure 10:
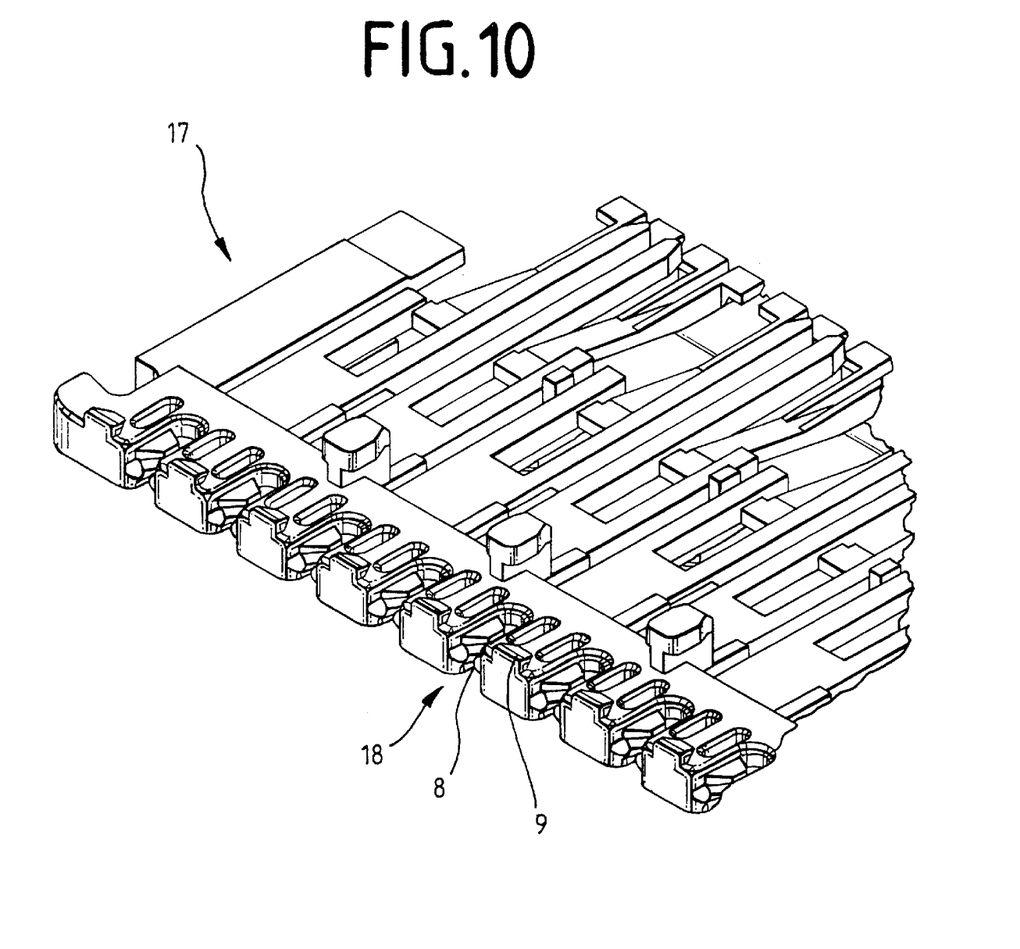
FIG. 10 is an enlarged illustration of part of the region of the slots for the insulation-piercing terminal connecting contacts.

In the contact region 18 of the insulation-piercing terminal contacts 7, 8, a molding 9 is integrally formed on one side of the housing parts of the modules 17. The molding 9 ensures that a fitting tool can be applied to the insulation-piercing terminal contact element 7, 8 in only one direction (FIG. 10). This ensures that the wire to be connected is always cut off on the correct side.

Corresponding to the illustrations in FIGS. 1 to 6, the contact spring 1 is designed in two pieces and is formed from a base part 3 and from a contact spring part 2. The parts 2, 3 can be manufactured from different materials in order to achieve optimal values for the spring travels and contact forces.

Figure 1:
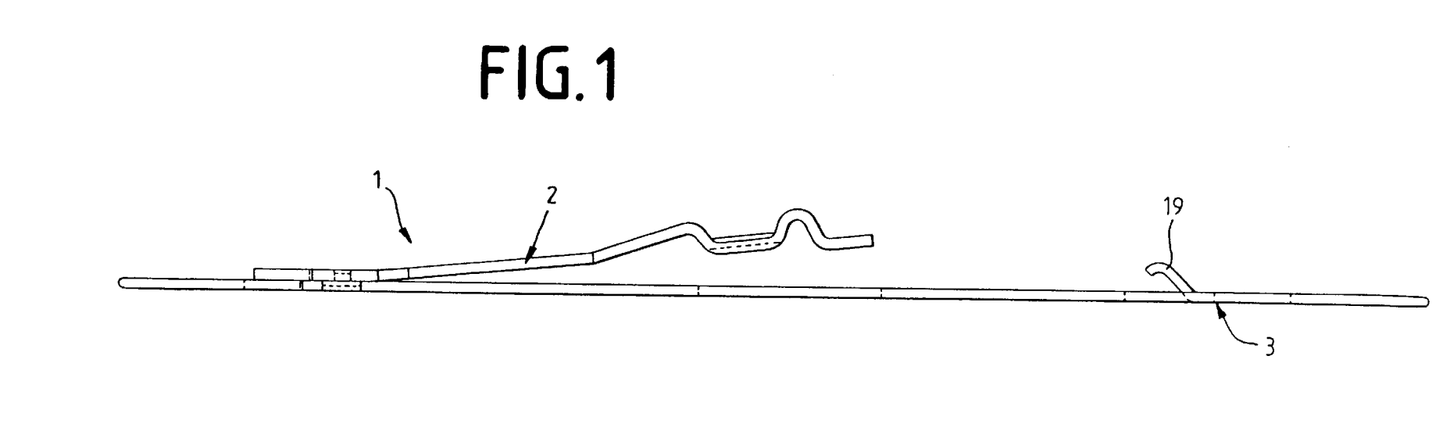
FIG. 1 is a side view of a contact spring according to the invention.
Figure 2:
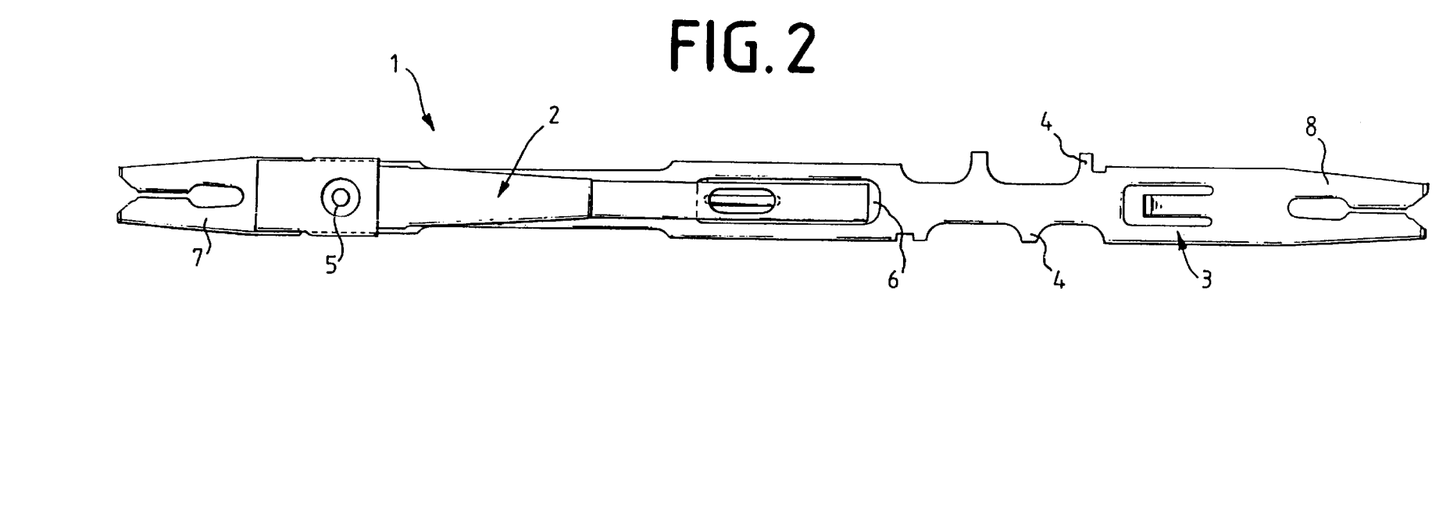
FIG. 2 is a plan view of the contact spring according to FIG. 1.
Figure 3:
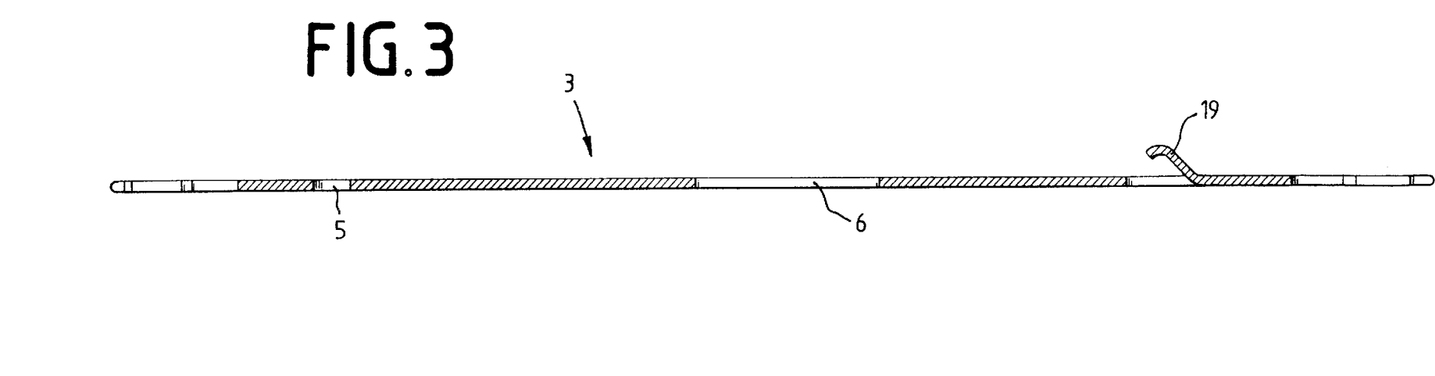
FIG. 3 is a side view of the base part of the contact spring according to FIGS. 1, 2.
Figure 4:
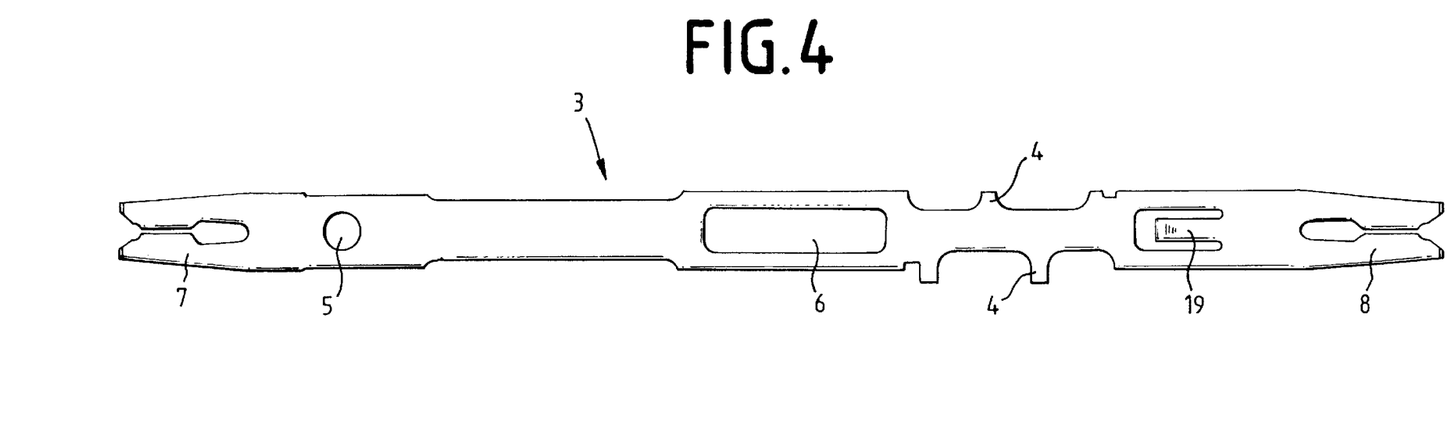
FIG. 4 is a plan view of the base part of the contact spring according to FIG. 3.

The base part 3 according to FIGS. 3, 4 forms the base for the contact spring 1. The base part 3 has an insulation-piercing terminal contact 7, 8 at each end. Fixing points 4 for the longitudinal direction are provided in the central region. A hole 5 is used to fix the position of the contact spring part 2 to be fitted, and an opening 6 is used for the fitted contact spring part 2 to pass through.

A pick-off contact 19 is used to make contact with test plugs.

Figure 5:
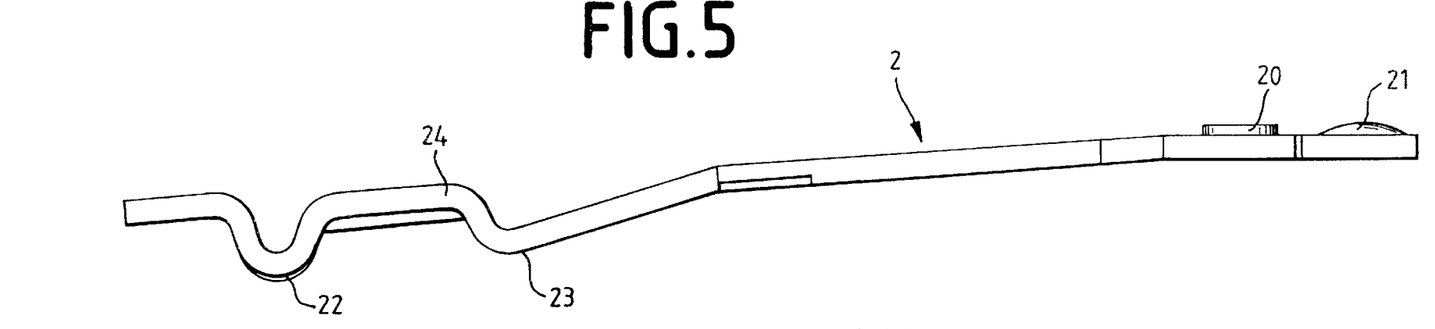
FIG. 5 is a side view of the contact spring part of the contact spring according to FIGS. 1, 2.
Figure 6:
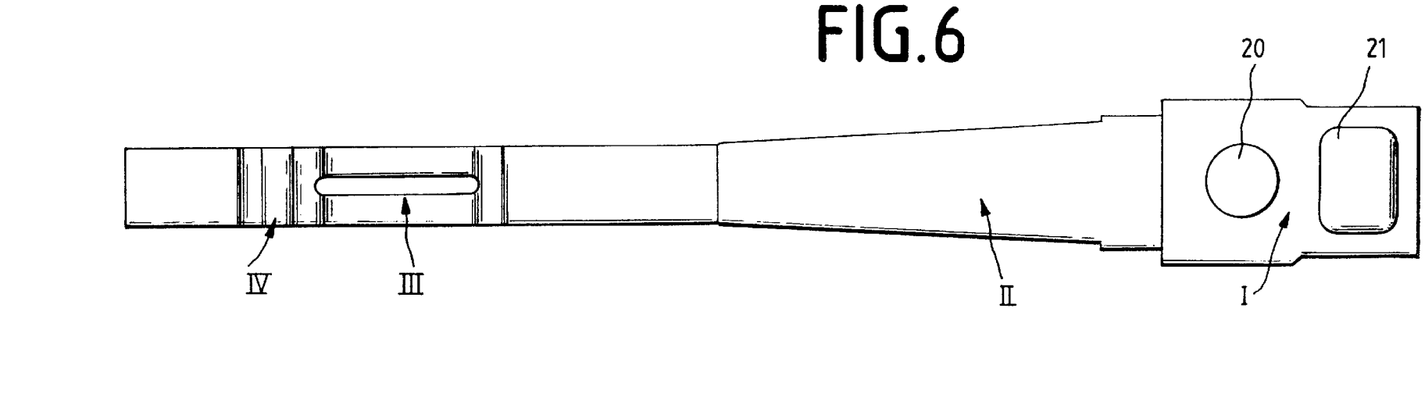
FIG. 6 is a plan view of the contact spring part according to FIG. 5.

The contact spring part 2 according to FIGS. 5, 6 has four regions. The first region I, with a guide stud 20 and a connection element such as a weld boss 21 are used for fixing the contact spring part 2 on the base part 1, for example by welding the hole 5 and guide stud 20 cooperate to form a spring registration means which fixes the relative position of the spring part 2 to the base part 1.

The second region II is the bending zone, in order to ensure the spring travel in the region III.

The region III, with the two contact surfaces 23, 22 for overvoltage protection and the telecommunications contact, is reinforced by a bead 24 in order to ensure that the spring travel at both contact points 22, 23 is approximately the same.

The region IV is used to support the prestressed spring part 2. The contact surfaces 22 of the contact springs 1 of the modules 17, which ire assembled as an upper part and as a lower part, abut in the assembled distribution block and together form the actual telecommunications contact of the distribution block.

The ratios of the lengths of the regions I to IV of the contact spring part 2 with respect to one another may be varied in order to optimize the required spring forces.

Figure 7:
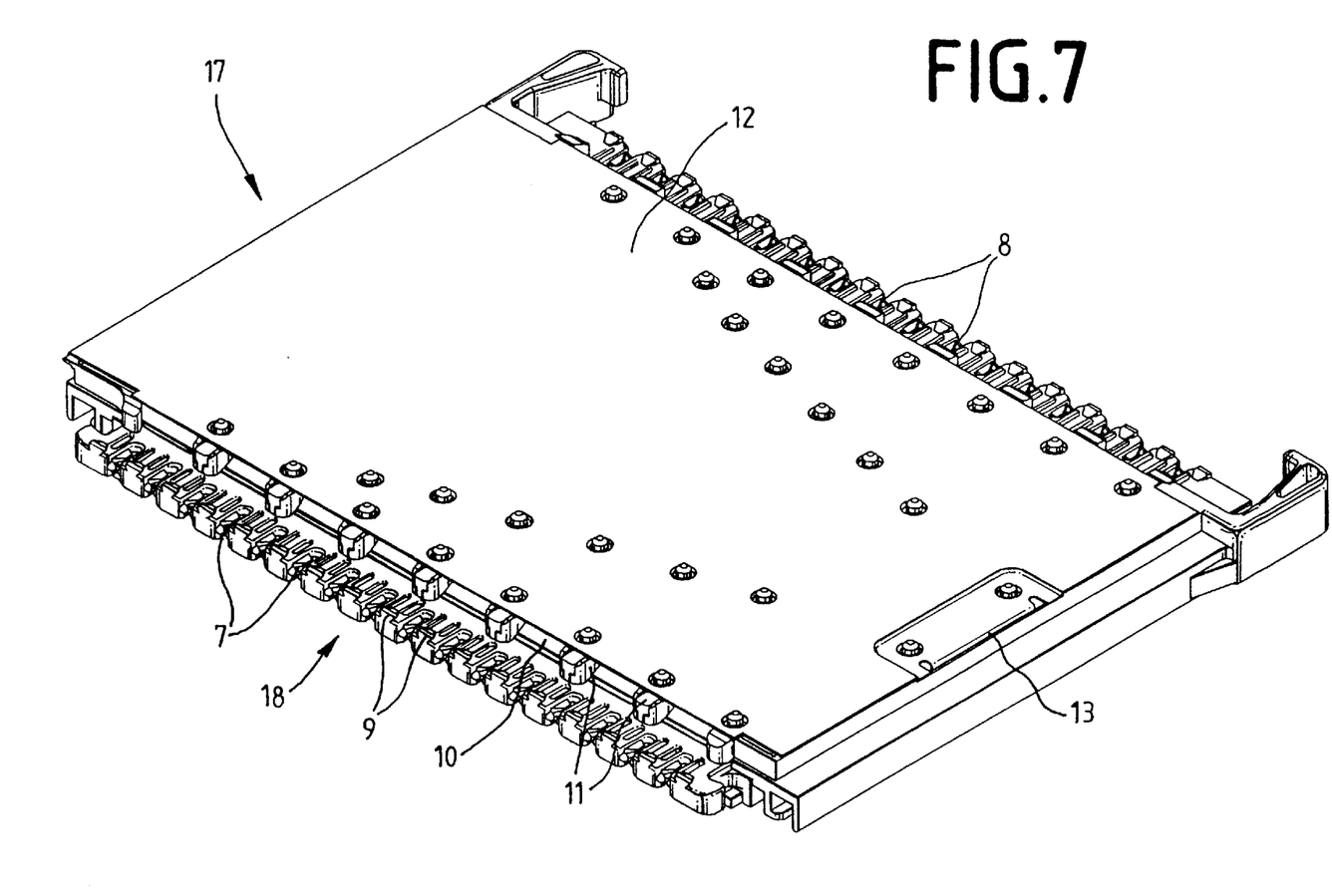
FIG. 7 is a perspective plan view of a completely assembled module of a distribution block.
Figure 8:
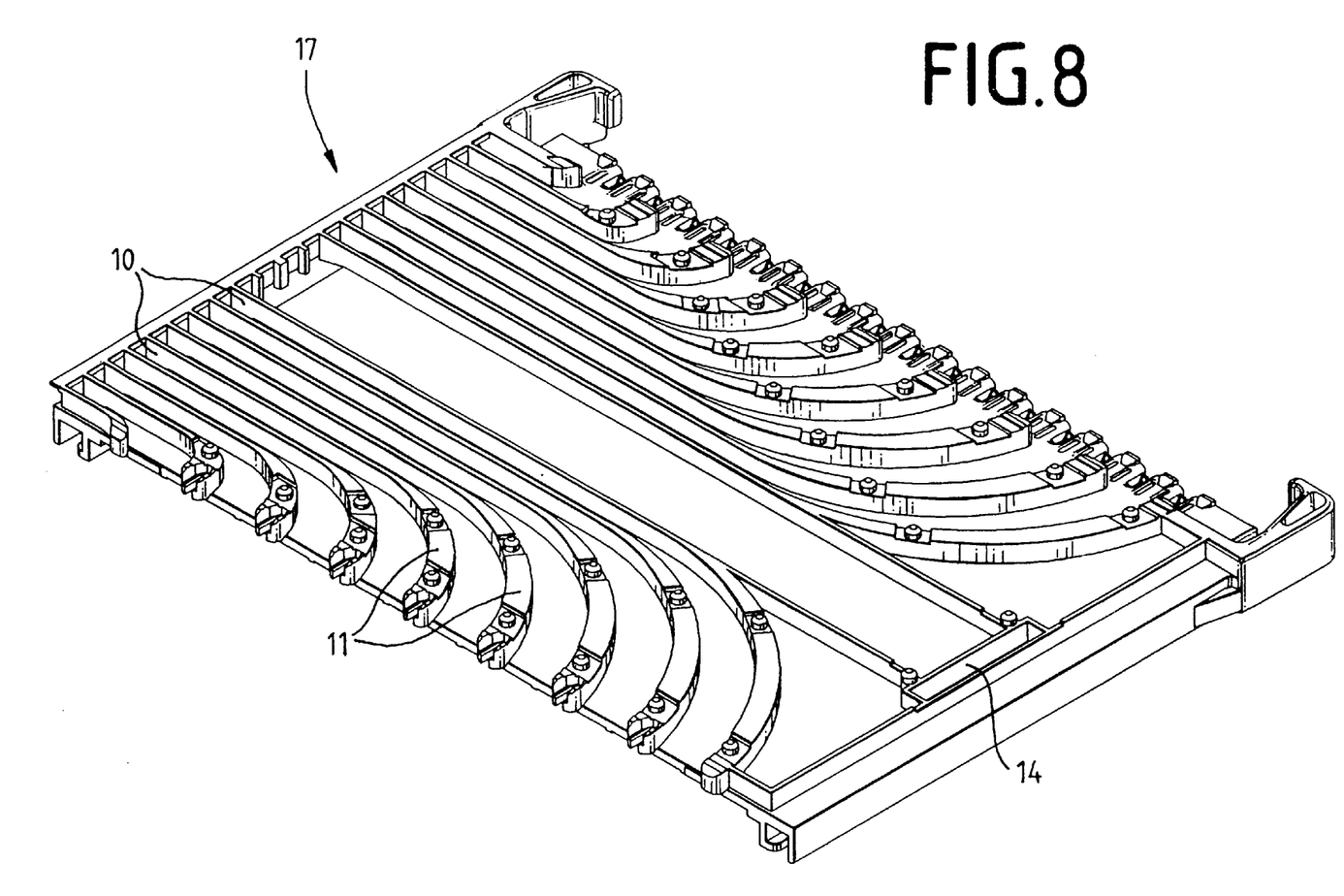
FIG. 8 is a perspective plan view of the open module, according to FIG. 7, of a distribution block.

FIGS. 7 and 8 show channels 10 for wire routing, which are integrally formed from a housing part of one of the modules 17 of the distribution block. These channels 10 have webs 11 on which an electrically conductive shielding plate 12 can be fixed in order to cover the top of the distribution block. The shielding plate 12 has a sprung tongue 13 (or spring tongue—FIG. 9) which is bent such that it can be passed at the point 14 (FIGS. 8, 9) through the housing part of the respective module 17 and, when the module 17 is being assembled, produces a ground connection to the frame, which is not illustrated.

While a specific embodiment of the invention has been shown and described in detail to illustrate the application of the principles of the invention, it will be understood that the invention may be embodied otherwise without departing from such principles.

What is claimed is:

1. A distribution block for telecommunication and data applications, comprising:

a module with chambers;

contact springs, each contact spring being arranged in a chamber, each of said contact springs including a connection contact disposed adjacent to a front side of the block and a connection contact disposed adjacent to a rear side of the block and a telecommunications contact in a central region, and a pick-off contact formed in a front region of the contact spring, each said connection contact being an insulation-piercing terminal, said contact spring including a base part and a contact spring part fitted to said base part, said base part including fixing points for a longitudinal direction fixing and an opening, provided in a central region of said base part for said contact spring part to pass through, and a hole arranged in a front region of the base part in order to fix the position of the contact spring part to be fitted to said base part.

2. The distribution block as claimed in claim 1, wherein said module includes a molding integrally formed on one side in a region adjacent to a contact region of each said insulation-piercing terminal.

3. The distribution block as claimed in claim 1, further comprising:

wire routing channels integrally formed on a part of said module, said routing channels having webs;

a shielding plate having a sprung tongue fitted to said webs, the tongue being bent and being passed through the housing of said module.

4. The distribution block as claimed in claim 1, wherein the contact spring is manufactured from different materials.

5. A distribution block comprising:

a module with a plurality of chambers;

a plurality of contact springs, each of said contact springs being arranged in one of said chambers, each of said contact springs including a connection contact disposed adjacent to a front side of the block, a connection contact disposed adjacent to a real side of the block, a telecommunications contact in a central region of a respective said contact spring, and a pickoff contact formed in a front region of said respective contact spring, each said connection contact being an insulation-piercing terminal, each said contact spring including a contact spring part;

a connection element connected to said contact spring part;

a base part connected to said contact spring element through said connection element, said base part including fixing points for a longitudinal direction fixing of said contact spring to said module, said base part defining an opening in said central region, said spring part being bendable through said opening;

spring part registration means on said spring part and said base part for fixing a position of said contact spring with respect to said base part.

6. The distribution block as claimed in claim 5, wherein said module includes a molding integrally formed on one side in a region adjacent to a contact region of each said insulation-piercing terminal.

7. The distribution block as claimed in claim 5, further comprising:

wire routing channels integrally formed on a part of said module, said routing channels having webs;

a shielding plate having a sprung tongue fitted to said webs, the tongue being bent and being passed through the housing of said module.

8. The distribution block as claimed in claim 5, wherein the contact spring is manufactured from different materials.

9. The distribution block as claimed in claim 1, further comprising:

another module with chambers, said modules being positioned together to provide the block and form an interior, said contact springs being arranged in said interior.

10. The distribution block in accordance with claim 5, wherein:

said spring part registration means includes a hole defined by one of said spring part and said base part, said spring part registration means includes a stud arranged on one of the other of said spring part and base part, said stud cooperating with said hole to fix said position of said contact spring with respect to said base part.

11. The distribution block in accordance with claim 5, wherein:

said spring part and said base part are formed of different materials.

12. The distribution block in accordance with claim 11, wherein:

a material of said spring part is optimized for spring travel, and contact force.

13. The distribution block in accordance with claim 5, wherein:

said module includes a molding for limiting an application of a fitting tool to said connection contacts in a single direction.

14. The distribution block in accordance with claim 13, wherein:

said single direction ensures that a wire to be connected is always cut off on a same side of said module.

15. A method for forming a contact spring for a chamber of module in a distribution block, the method comprising the steps of:

providing a base part;

forming a connection contact on said base part disposed adjacent to a front side of the block, said connection contact being an insulation-piercing terminal;

forming a connection contact on said base part disposed adjacent to a rear side of the block, said connection contact being an insulation-piercing terminal;

forming a telecommunications contact in a central region of said contact spring;

forming a pick-off contact in a front region of said contact spring;

providing a contact spring part;

registering said contact spring with said base part to fix a relative position of said spring part with said base part;

connecting said contact spring part to said base part through a connection element.

16. The method in accordance with claim 15, further comprising:

providing another module with chambers;

positioning said modules together to provide the block and form an interior;

arranging said contact springs in said interior.

\* \* \* \* \*